Sept. 20, 1960  B. A. BERGSTEDT  2,953,013

METHOD OF MEASURING THE PARTICLE CONCENTRATION OF AEROSOLS

Filed June 4, 1956

2,953,013
METHOD OF MEASURING THE PARTICLE CONCENTRATION OF AEROSOLS

Bengt Allan Bergstedt, Solna, Sweden, assignor to Aktiebolaget Atomenergi, Lovholmsvagen, Sweden, a Swedish company Filed June 4, 1956, Ser. No. 589,132

Claims priority, application Sweden June 8, 1955

1 Claim. (Cl. 73—28)

The invention relates to a method of measuring the particle concentration, for example in grams per cubic metre, of an aerosol by means of an electrostatic precipitator.

It has been shown that for all electrostatic precipitators, whether used for industrial gas cleaning or for measurement purposes, the efficiency $p$, defined by the equation $$p = \frac{n_0 - n}{n_0}$$

where $n_0$ and $n$ are the number of particles per unit volume of the aerosol at the entrance and exit of the precipitator, respectively, is given by the equation:

$$p = 1 - e^{-\frac{Sv}{q}}$$

where $S$ = surface area of the collecting electrode of the precipitator.
$v$ = mean velocity of the particles towards this surface.
$q$ = flow rate of the gas through the precipitator.

In this equation S is constant for a given precipitator, and for a specified value of the operating voltage or corona current $v$ is also approximately constant; $v$ depends also on the size and the electrical properties of the particles and on the pressure and temperature of the gas. Thus $p$ becomes a function of $q$, and this function shows a rapid fall when $q$ is increased. Solving the above formula for $q$ it will be seen that the flow rate $$q = \frac{Sv}{\log e \left(\frac{1}{1-p}\right)}$$

For industrial precipitators a maximum efficiency, i.e. a high value of $p$, is wanted which means that $q$ must be restricted to relatively low values.

The same rule has been applied to precipitators for measurement purposes, and it has been thought that the greater accuracy in the measurement the higher collection efficiency $p$ should be used and that the flow rate $q$ must be comparatively low.

The invention is based upon the fact that the accuracy and sensitivity of the measurement does not depend on a high value of the efficiency $p$, but are on the contrary increased when $p$ is low, for example 20 to 25%. The inventor has found that, for moderate values of the gas flow rate $q$, the sensitivity of the measurement is a function of the product $p \cdot q$ which increases rapidly for small $q$-values and tends towards a saturation value $S \cdot v$ when $q$ is increased. When the electrostatic precipitator operates at or near saturation (for not too high flow rates) the amount of dust precipitated in the unit of time will be nearly independent of the flow rate $q$.

According to the invention the aerosol to be measured is passed between the ion emitting electrode and the collection electrode at such a high rate that the product of the collection efficiency and said flow rate will be practically independent of the flow rate.

The amount A of dust particles collected in a given time T can be measured in one way or the other and by different means, for example by weighing or, in case of radioactive dust, by radioactivity detectors. What is wanted is the amount of dust per unit volume R. This is given by the equation $R \cdot pqT = A$, or $$R = \frac{A}{pqT}$$

where A, $q$, and T are measured and $p$ is known for a precipitator which has been calibrated. The efficiency $p$ can otherwise easily be determined by two measurements with two precipitators in series. In the first measurement one gets the amounts $A_1 = R p_1 q T$ in the first precipitator
$A_2 = R(1-p_1)p_2 q T$ in the second.

In the second measurement, in which the precipitators have changed their places, one gets $A_1 = R p_2 q T$ and $A_2 = R(1-p_2)p_1 q T$.

From these equations $p_1$ and $p_2$ can easily be calculated as all quantities except R are known. It is not necessary for the aerosol concentration R to be equal in the two measurements.

The mode of operation of the precipitator according to the invention gives especially the following advantages. For a given collection surface area and particle velocity towards this surface the number of particles collected in the unit of time will be approximately maximal and will be nearly independent of the gas flow rate through the precipitator. The distribution of the dust over the collection area will be more uniform than when the precipitator is operated at a high collection efficiency.

The present method is with particular advantage carried out with an instrument described in my copending U.S. application Serial No. 589,131, filed June 4, 1956, titled "Electrostatic Precipitator." With such an instrument the concentration of the radioactivity of a radioactive aerosol was determined in the following way. The air in a room, where a great quantity of uranium ore was stored, was tested. This air was expected to have a relatively high percentage of radon which would essentially increase the radioactivity over the normal radioactivity of the air.

In the apparatus the collection surface was 16.0 square centimeters and the point shaped emission electrodes were set to a distance of 5.60 millimeters from the collection electrode. The apparatus had been calibrated at a gas flow rate of 0.575 cubic meter per minute, and was then found to have a precipitation efficiency of 16.6 percent. At working voltage the corona current was 1.60 milliamperes for 120 point electrodes, i.e. about 13 microamperes per point electrode.

Experiments have shown that when the instrument is run in this way within the range where the value of $p \cdot q$ is substantially constant, the functions $p$ and $pq$ coincide with the theoretical ones within an accuracy of 1.5 percent. Thus, for instance, a variation of the air flow rate with 15 percent from the value given above renders a variation of only 2 percent of the $pq$-value, that is the sensitivity.

The theoretical functions $p$ and $pq$ are shown in the attached drawing as functions of the dimensionless variable $$x = \frac{q}{Sv}$$

What is claimed is:

A method of measuring with great accuracy the particle concentration of an aerosol by passing the same between an ion emitting electrode and a collection electrode of an electrostatic precipitator while maintaining between said electrodes an electric potential of a corona producing voltage to cause precipitation of particles from the aerosol onto said collection electrode, the aerosol rate of flow being within the region of relatively high flow rates where an essential increase in flow rate renders only an immaterial increase in precipitation rate, the efficiency of the precipitator being less than 25 percent, and measuring the precipitate obtained on said collection electrode during the passage of the aerosol.

References Cited in the file of this patent
UNITED STATES PATENTS

| | | |
|---|---|---|
| 2,307,602 | Penney et al. | Jan. 5, 1943 |
| 2,484,202 | Wintermute | Oct. 11, 1944 |